Feb. 13, 1968   M. E. DEUTSCH   3,368,783
APPARATUS FOR MOUNTING A TESTING DEVICE
Filed Feb. 1, 1966   2 Sheets-Sheet 1
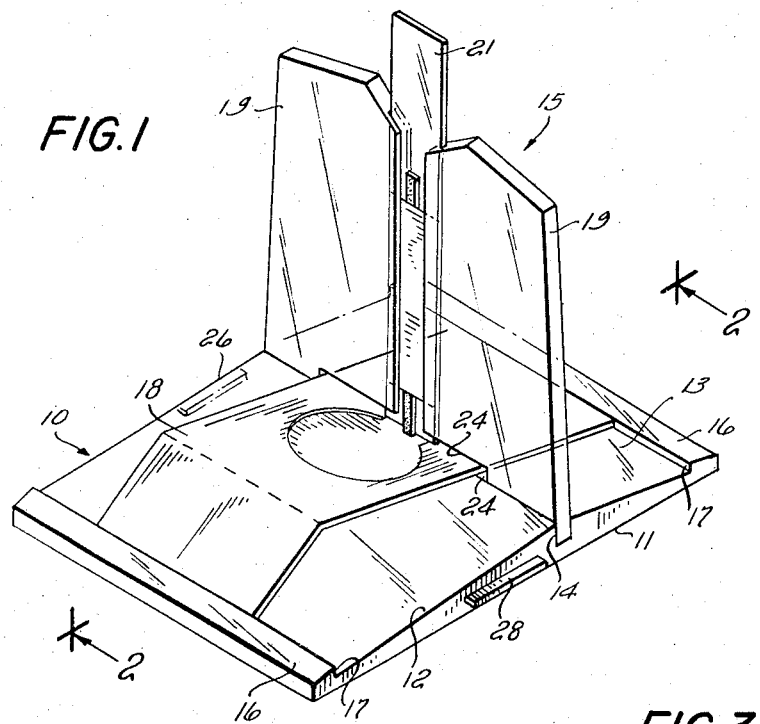
FIG. I
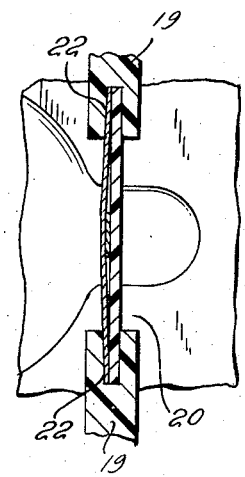
FIG. 3
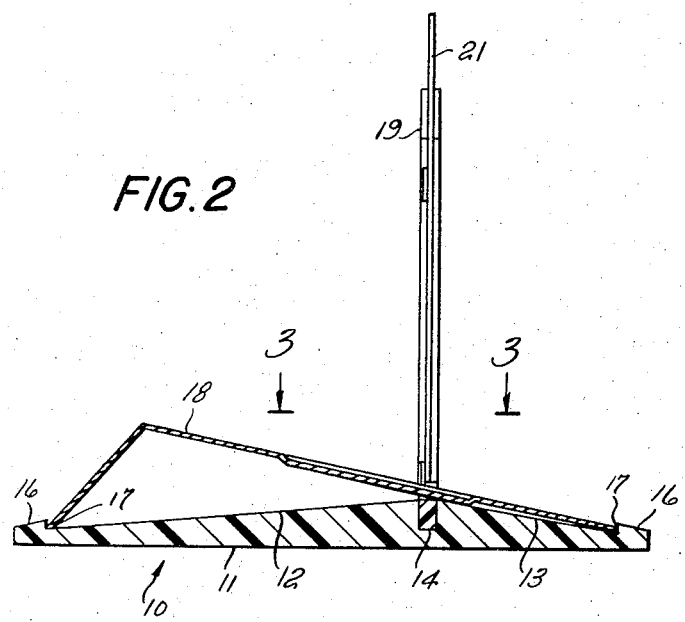
FIG. 2
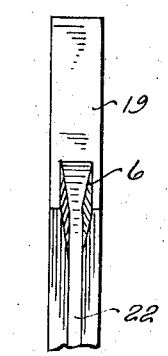
FIG. 6
INVENTOR
MARSHALL E. DEUTSCH
BY
Kane, Dalsimer, Kane & Smith
ATTORNEYS Feb. 13, 1968  M. E. DEUTSCH  3,368,783
APPARATUS FOR MOUNTING A TESTING DEVICE
Filed Feb. 1, 1966  2 Sheets-Sheet 2

INVENTOR
MARSHALL E. DEUTSCH
BY
Kane, Dalsimer, Kane & Smith
ATTORNEYS

United States Patent Office 3,368,783
Patented Feb. 13, 1968

3,368,783
APPARATUS FOR MOUNTING A TESTING DEVICE
Marshall E. Deutsch, Hillsdale, N.J., assignor to Becton Dickinson and Company, East Rutherford, N.J., a corporation of New Jersey
Filed Feb. 1, 1966, Ser. No. 524,155
7 Claims. (Cl. 248—176)

ABSTRACT OF THE DISCLOSURE

An apparatus for mounting a test sample and a test strip of the type useful in making biological and chemical determinations and in analyzing specimens; the apparatus having means for supporting the test sample thereon and means mounted on the apparatus for supporting the test strip above the sample to be tested so that one end of the test strip contacts the sample.

---

This invention relates to an apparatus for mounting a test sample and a test strip of the type useful in making biological and chemical determinations and in analyzing specimens. An example of such a test strip is a chromatographic test strip in which selected constituents of the sample are isolated and identified by chromatographic means. Such samples or specimens may be, for example, small quantities of plasma, serum or other fluids in which chromatographic procedures may be readily employed for determining selected constituents contained therein.

When chromatographic tests or other analysis procedures are employed, it generally requires the use of specially designed laboratory equipment which is cumbersome and expensive and requires, in many instances, an exhaust system so that any evolved gases from noxious chemicals employed to develop chromatographic plates may be exhausted through the system. These devices are not portable and cannot be used for field testing procedures nor do they lend themselves for use in doctors' offices where tests to determine selected constituents of plasma, serum or other parenteral fluids would be helpful for proper diagnosis. Heretofore, where such tests were required, the sample to be tested generally was sent to a clinical laboratory for determination. In some instances, only a relatively small volume of sample is available and may be lost or contaminated when transferring it from one container to another. In more recent developments, strips were prepared which were pretreated with chemicals so that a sample to be tested need only be impregnated on the test strip and observed to determine the selected constituent. However, suitable apparatus for mounting such test strips during testing are generally not available and those that are available are not portable or easily assembled and are not practical for use in a doctor's office.

It is a particular object of the present invention to provide a practical, inexpensive apparatus which may be employed for mounting a sample to be tested and a testing device so that a particular constituent of the sample may be simply and easily determined. Another object of the present invention is to overcome the difficulties and disadvantages heretofore encountered when employing apparatus for chromatographic procedures and to provide an improved apparatus which is portable; which is relatively small so that a chromatographtic test slide may be simply and easily mounted thereto when a liquid to be tested is mounted on the apparatus; and which does not require an exhaust system to remove noxious gases evolved when the test strip is developed.

In general, my apparatus for supporting a test sample and a test strip of a type useful in making biological and chemical determinations and analyses of the sample comprises a base member for supporting a material to be tested thereon with a bracket extending upwardly thereabove and formed with means for supporting a test strip above the base member so that it extends downwardly into communication with a test sample.

My apparatus is particularly suited for mounting a small test sample of a biological fluid such as blood, plasma or serum, as for instance a sample which is obtained by an apparatus described and claimed in United States Patent No. 3,146,163, granted Aug. 25, 1964, for "An Apparatus for Separating Certain Components From Blood." It should be understood, however, that my apparatus may be varied in size and shape so as to be adapted to support any type of sample which can be mounted within close proximity to the testing device so as to be engageable therewith. When employing the apparatus described in U.S. Patent No. 3,146,163, only a relatively small volume of serum or plasma is obtained from a whole blood sample. Such an apparatus is particularly suited for use in a doctor's office or in the field where other separating equipment is not available. Thus, a doctor or technician may employ such a sample separating apparatus for testing a number of constituents found in the blood by simply employing various chromatographic test strips which are specifically treated for certain constituents contained in plasma or serum. It is not necessary for the doctor to send such blood samples to a laboratory for testing since the apparatus for supporting test slides is compact, relatively inexpensive, easy to employ and is convenient to use.

In the accompanying drawings which exemplify a preferred form of my apparatus:

FIG. 1 is a perspective view of the apparatus embodying my invention which illustrates a sample mounted in position with a testing device supported adjacent the sample and in communication therewith;

FIG. 2 is a sectional view in the direction of the arrows on the lines 2—2 of FIG. 1;

FIG. 3 is a partially fragmentary view in cross-section, in the direction of the arrows on the lines 3—3 of FIG. 2 showing a testing device mounted on the apparatus;

FIG. 6 is a partially fragmentary detailed view of one portion of the supporting means for holding a testing device;

Figure 4:
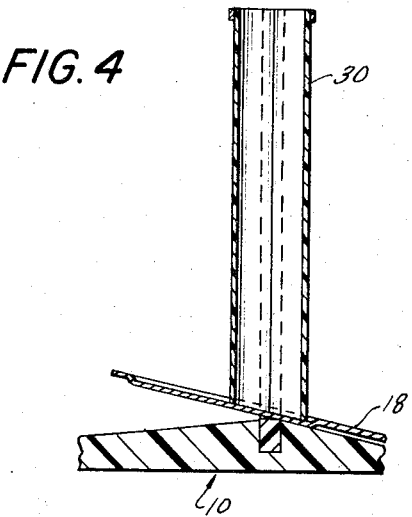
FIG. 4 is a partially fragmentary sectional view of the apparatus shown in elevation embodying a test strip supporting tube employed with my apparatus.

Referring to the drawings and, more particularly, to FIGS. 1 through 3 thereof, my improved apparatus comprises a base member 10 which has a relatively flat bottom surface 11 with the upper surface having inclined portions 12 and 13, the planes of which intersect along a line formed transversely across a portion of base 10. Inclined portions 12 and 13 form a major portion of the upper surface of base 10. Along the line in which inclined surfaces 12 and 13 intersect, groove or channel 14 is formed transversely across base 10 so as to form a mounting means for bracket or upstanding member 15. Along the opposite end portions of base 10, raised ribs 16 are provided so as to form confronting shoulder portions for engaging and supporting slide 18 for holding a test sample thereon as seen in FIG. 1.

Bracket 15 is mounted in transverse groove 14 in a substantially vertical position having a pair of transversely spaced aligned upright standards 19 with a space 20 between them extending downwardly to base member 10. The confronting edges of standards 19 are formed with longitudinally aligned slots 22 for accommodating and supporting test device 21 so that it extends downwardly into communication with a test sample disposed on the sample holding slide 18. A transverse recess 24 is provided on the lower surface of the adjacent portions of standards 19 for accommodating the sample holding device 18 mounted in fixed position on base member 10 as seen most clearly in FIG. 1. It should be understood that bracket 15 may be formed as a pair of standards which may be moved inwardly or outwardly along transverse groove 14 of base member 10 or may be formed so that standards 19 are mounted in a fixed position on base 10 as a unitary bracket. Further, any means may be employed mounted on base member 10 for holding a test sample to be tested when testing device 21 is mounted in fixed position on bracket 15, such as a recess formed in base member 10 and aligned with slot 20.

Base member 10 may be provided with coupling means for releasably coupling a plurality of apparatus in tandem relationship. Recess 26 is formed along one side of base 10 and transversely aligned therewith is a tab portion 28 extending from the other side of base 28. Thus, all that is required to couple a second device is to insert tab 28 into the corresponding slot 26 of the other device.

Figure 5:
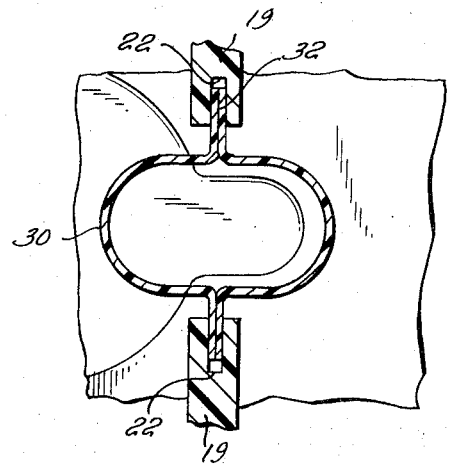
FIG. 5 is a partially fragmentary and sectional plan view of FIG. 4 showing the manner in which the supporting tube is mounted in the bracket.

In FIGS. 4 and 5 a supporting tube 30 is formed having diametrically and longitudinally extending ribs 32 so that tube 30 may be removably mounted within aligned slots 22 formed on standards 19. Thus, where a test slide is employed in which the width thereof is substantially smaller than slot 20 the test slide may be supported in a substantially vertical position by tube 30. Also where a gas is evolved due to the reaction of the chemicals impregnated on a test slide and the sample to be tested and in which the evolved gas is necessary in order to develop the test strip, tube 30 enables the gas to flow upwardly therethrough and contact the test strip together with the chemicals thereon to cause their development. Since a very small quantity of sample and impregnated chemicals are employed on the test strip, only a relatively small volume of gas is evolved and would not require the use of an exhaust system to remove the evolved gas.

Figure 7:
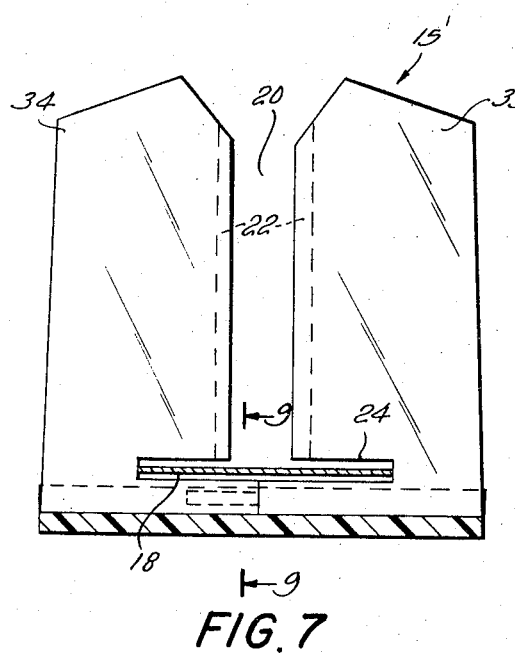
FIG. 7 is an elevational view of a modified form of my apparatus illustrating one form of structure for adjusting the width of the bracket for supporting a testing device showing the bracket adjusted inwardly.
Figure 8:
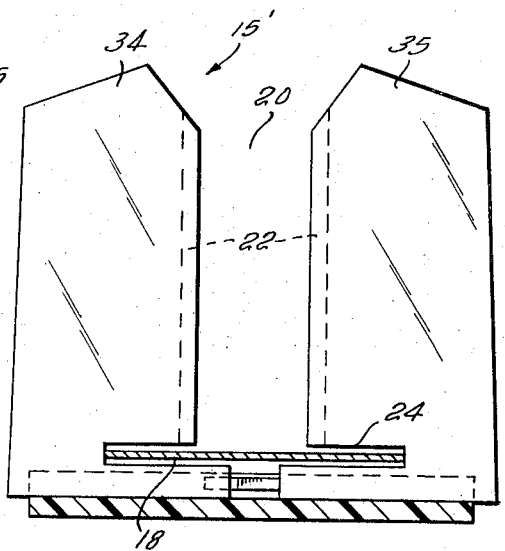
FIG. 8 is a similar elevational view ass hown in FIG. 7 in which the bracket for mounting a testing device has been adjusted to a wider position.

In FIGS. 7 and 8, bracket 15' is formed having a pair of standards 34 and 35 which are shiftable toward and away from each other so that the slot or opening 20 formed therebetween may be so positioned that a test slide may be slideably mounted in the confronting channels 22 of the standards 34 and 35. In FIG. 7 standards 34 and 35 have been adjusted so that the width of slot 20 has been substantially reduced and in FIG. 8 the width of slot 20 has been substantially expanded by moving standards 34 and 35 outwardly. Thus by simply moving standards 34 and 35 toward or away from each other in transverse groove 14 of base member 10, many different types of test slides may be accommodated when employing the structure of bracket 15' as shown in FIGS. 7 and 8.

Figure 9:
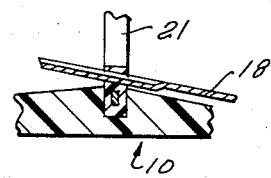
FIG. 9 is a partially fragmentary sectional view in the direction of the arrows on the lines 9—9 of FIG. 7.

In FIG. 9 a partially fragmentary sectional view illustrates the sample holding device 18 mounted on base 10 so that the test device 21 is in communication with a sample disposed in the recess of sample holding device 18.

Any suitable rigid material may be employed for forming the apparatus as, for example, wood, rigid plastic, metal or other suitable material. I prefer to employ a rigid plastic material such as polymethyl methacrylate (Plexiglas).

When utilizing the apparatus disclosed herein, a sample to be tested is mounted on base member 10 so that the sample is disposed beneath slot 20 formed by standards 19 of bracket 15. A test slide such as a chromatographic test strip 21 is slideably mounted in confronting slots 22 formed in standards 19 so that slide 21 is in a substantially vertical position and in communication with the test sample mounted on base member 10. Also, holder 30 may be slideably mounted in confronting slots 22 formed in standard 19 so that holder 30 is in a substantially vertical position and where a test slide is employed in which the width thereof is substantially smaller than slot 30, the test slide may be supported in a substantially vertical position by holder 30. The sample will then be absorbed by the chromatographic test strip 21 and will be dispersed therethrough by capillary action to react with chemicals impregnated thereon so that the desired constituent contained in the test sample is determined. It is obvious that many different chromatographic test strips may be employed in which the chemicals impregnated thereon are varied so that many different constituents may be tested from a given test sample. My test apparatus may be employed in a doctor's office and also in the field where separating or other laboratory equipment are not available. The device is easily assembled and employed by unskilled technicians.

Changes may be made in design and structure of my device without departing from the spirit and scope of my invention as defined in the appended claims.

I claim:

1. Apparatus for mounting a test sample and a test strip of the type useful in making biological and chemical determinations and in analyzing specimens comprising: a base member having an upper surface and flat lower surface for resting on a supporting surface and having sample supporting means formed on the upper surface arranged to support a test sample thereon and bracket means including a pair of upright standards mounted on the base member in spaced aligned relationship with the space between the standard being positioned above the point of supporting of the test sample on the sample supporting means, the aligned edges of said standards being formed with confronting slots for supporting a test device so that it extends downwardly into communication with the test sample.

2. Apparatus for mounting a test sample and a test strip of the type useful in making biological and chemical determinations and in analyzing specimens as set forth in claim 1 in which the standards are shiftable toward and away from each other so as to support devices of different width.

3. Apparatus for mounting a longitudinally flexible slide containing a test sample and also for supporting a test strip of the type useful in making biological and chemical determinations and in analyzing specimens comprising: a base member having a flat lower surface for resting on a supporting surface and formed with confronting shoulders adjacent opposite ends on its upper surface for engaging and supporting a slide containing a test sample therebetween and bracket means including a pair of transversely spaced aligned upright standards mounted on the base member with the space between the standards being formed with recesses adjacent the upper surface of the base member on opposite sides of the space for accommodating the slide holding the test sample and the confronting edges of the standards being formed with longitudinally aligned slots for accommodating and supporting a test device so that it extends downwardly into communication with the test sample.

4. Apparatus for mounting a longitudinally flexible slide containing a test sample and also for supporting a test strip of the type useful in making biological and chemical determinations and in analyzing specimens as set forth in claim 3 in which the base member is provided with a transverse slot along one side thereof and a tab portion extending laterally from the other side of said base transversely aligned therewith so as to provide a means for coupling a plurality of said apparatus in tandem relationship.

5. Apparatus for mounting a test sample and a test strip of the type useful in making biological and chemical determinations and in analyzing specimens comprising: a base member having a flat lower surface for resting on a supporting surface and having an upper surface arranged to support a test sample thereon and bracket means including a pair of upright standards mounted on the base member in spaced aligned relationship with the space between the standards being positioned above the point of supporting of the test sample, the aligned edges of said standards being formed with confronting slots for supporting a test device, a transverse recess formed in the lower portions of the standards for accommodating a device containing the test sample so that the testing device extends downwardly into communication with the test sample.

6. Apparatus for mounting a test sample and a test strip of the type useful in making biological and chemical determinations and in analyzing specimens comprising: a base member having a flat lower surface for resting on a supporting surface and having an upper surface arranged to support a test sample thereon; said base member having shoulder portions adjacent its opposite ends for engaging and supporting a slide for holding a test sample and bracket means including a pair of upright standards mounted on the base member in spaced aligned relationship with the space between the standards being positioned above the point of supporting of the test sample, the aligned edges of said standards being formed with confronting slots for supporting a testing device, a transverse recess formed in the lower portions of the standards for accommodating a device containing a test sample so that the testing device extends downwardly into communication with the test sample.

7. An apparatus for mounting a test sample and a test strip of the type useful in making biological and chemical determinations and in analyzing specimens as set forth in claim 1 in which a supporting tube is disposed between the upright standards and is slidably mounted therebetween, the tube having diametrically opposed ribs extending longitudinally thereof and disposed in the confronting slots formed along the aligned edges of the standards.

References Cited

UNITED STATES PATENTS

| 852,451 | 5/1907 | Requa | 248—469 |
| 2,796,689 | 6/1957 | Yannone | 248—473 X |

FOREIGN PATENTS 610,986  10/1948  Great Britain.

CHANCELLOR E. HARRIS, *Primary Examiner.*